(12) United States Patent
Cooppan (10) Patent No.: US 8,159,960 B2
(45) Date of Patent: Apr. 17, 2012

(54) CONTENT PROCESSING DEVICE MONITORING

(75) Inventor: Dayalan Cooppan, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 876 days.

(21) Appl. No.: 11/612,251

(22) Filed: Dec. 18, 2006

(65) Prior Publication Data

US 2008/0144519 A1    Jun. 19, 2008

(51) Int. Cl.
*H04L 1/00* (2006.01)
(52) U.S. Cl. .................. 370/252; 370/395.21; 348/161; 725/116
(58) Field of Classification Search .................. 370/252
See application file for complete search history.

(56) References Cited

U.S. PATENT DOCUMENTS

| | | | |
|---|---|---|---|
| 4,471,480 A * | 9/1984 | Haussmann et al. | 370/242 |
| 2003/0056212 A1* | 3/2003 | Siegel et al. | 725/31 |
| 2003/0206553 A1* | 11/2003 | Surcouf et al. | 370/419 |
| 2005/0238005 A1* | 10/2005 | Chen et al. | 370/389 |
| 2006/0034185 A1* | 2/2006 | Patzschke et al. | 370/252 |
| 2006/0067216 A1* | 3/2006 | Lalonde et al. | 370/230 |
| 2006/0120368 A1* | 6/2006 | Aboukarr et al. | 370/390 |
| 2007/0019549 A1* | 1/2007 | Okabe | 370/232 |
| 2007/0165654 A1* | 7/2007 | Chai et al. | 370/401 |
| 2007/0291654 A1* | 12/2007 | Pepper | 370/252 |
| 2008/0069002 A1* | 3/2008 | Savoor et al. | 370/241 |

* cited by examiner

*Primary Examiner* — Seema S Rao
*Assistant Examiner* — Wanda Russell (57) ABSTRACT

A system, method, and apparatus for monitoring performance of a content processing device are disclosed. A system may include a content processing device and a customer premises management system (CMS) in communication with the content processing device. The CMS generally monitors hardware performance, network performance, and video quality parameters of the content processing device. The CMS may determine an operating status of the content processing device from at least one of the hardware performance, network performance, and video quality parameters.

28 Claims, 3 Drawing Sheets

CONTENT PROCESSING DEVICE MONITORING

BACKGROUND

Presently, many telecommunications customers receive video content via a content processing device, such as a set top box (STB). Content processing devices such as STBs may receive media from service providers by way of a remote media server via a media distribution network, or other networks, e.g., packet switched networks, the Internet, etc. Service providers may thereby transmit media, including any combination of images, audio, video, etc., to content processing devices. Content processing devices such as STBs are often connected to media playback devices such as televisions, stereos, and the like that are designed for enhanced playback of many forms of media content.

Quality of media transmitted to a content processing device may be degraded as a result of problems with the content processing device, and networks or servers transmitting media to the content processing device. Typically a customer experiencing media quality issues or outages must contact a service provider to notify the service provider of the issue If a network problem has not already been identified by the service provider, the service provider must frequently send service personnel to the customer's premises to diagnose the problem. This is especially burdensome for customers when service personnel are not immediately available. Once service personnel arrives and diagnoses the problem, the service provider may take corrective action with respect to the content processing device, or the media distribution network. Where problems with the media distribution network must be addressed, service personnel may not need to fix any equipment on the customer's premises. Such cases can be particularly aggravating for customers who have waited for service personnel to arrive and diagnose the problem only to find that the root cause is elsewhere in the media distribution network, resulting in further delay. Additionally, service calls are a cost that is undesirable for the service provider, which may realize increased costs of doing business as a result of service calls, and for customers, who may be required to pay for service calls directly or indirectly through higher service charges.

Accordingly, service providers typically must be located on customer premises to diagnose service issues or interruptions Customers must therefore wait for service personnel to arrive to diagnose service issues, and generally are not able to diagnose issues on their own, thereby increasing costs associated with media delivery networks.

DETAILED DESCRIPTION

Systems, methods, and apparatuses for monitoring performance of a content processing device, e.g., an STB, are disclosed. An exemplary system may generally include a content processing device and a customer premises management system (CMS) in communication with the content processing device over a telecommunications network, e.g., a packet switched network. The CMS generally monitors performance of a hardware, network, and video quality parameters of the content processing device remotely via the telecommunications network. For example, one or more monitoring probes and a monitoring agent may generally report various operating parameters of a media distribution network and the content processing device to the CMS, which determines an operating status of the media distribution network or the content processing device. A customer service representative (CSR) may thereby remotely identify service interruptions or media quality issues within a media distribution network or a content processing device and deploy troubleshooting tools accordingly.

Figure 1:
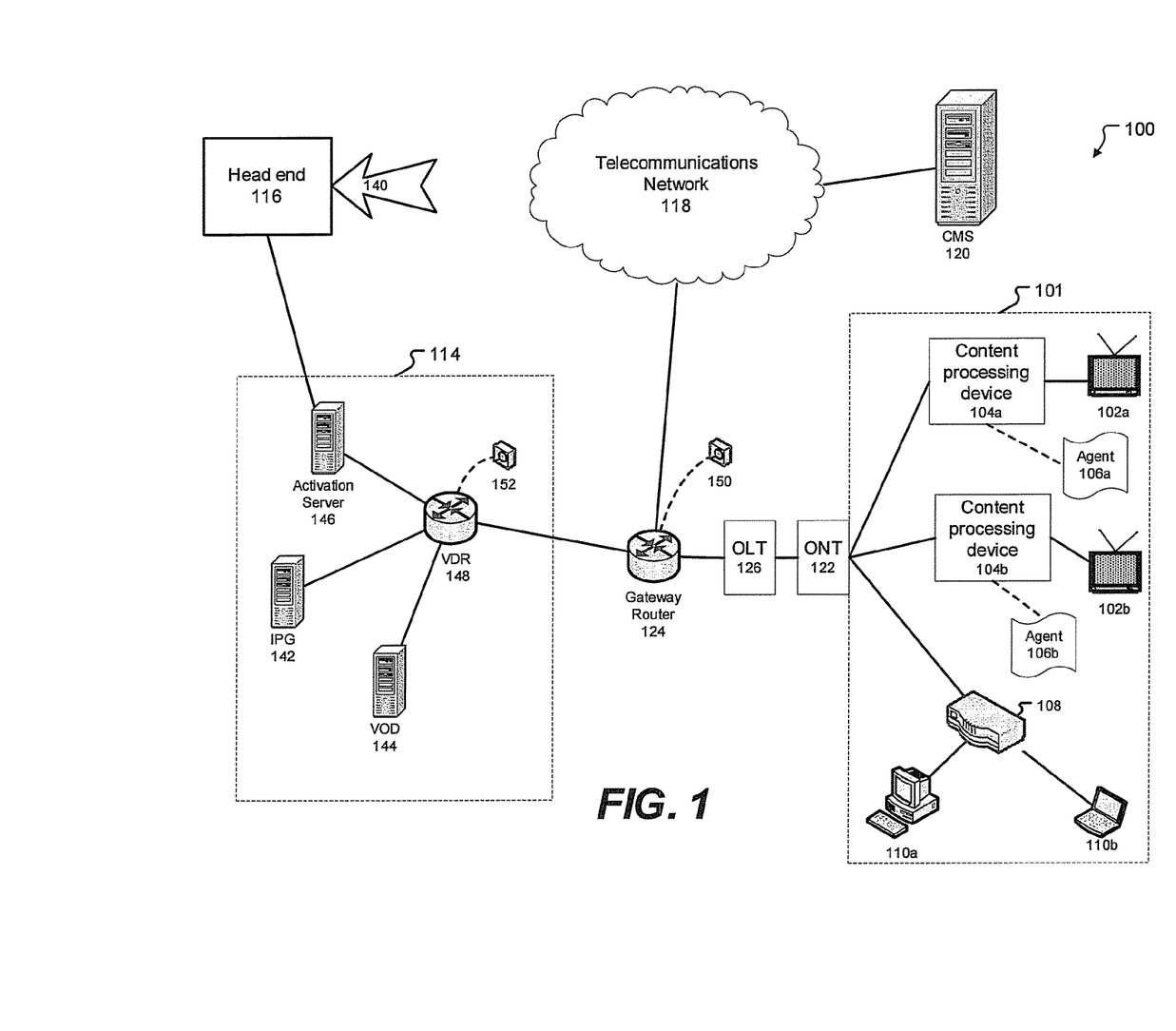
FIG. 1 illustrates an exemplary architecture of a system for monitoring a content processing device.

Turning now to FIG. 1, an exemplary system 100 for monitoring performance of a content processing device is illustrated. System 100 generally includes a customer premises network 101 in which user-selected media content, including any combination of images, audio, video, etc., may be provided to a media playback device 102 through a content processing device 104 attached to the customer premises network 101. Customer premises network 101 may receive media content from a head end 116 via a media distribution network 114, as is generally known. System 100 further includes a customer premises management system (CMS) 120, which selectively communicates with content processing device 104 via telecommunications network 118.

As illustrated in FIG. 1, customer premises network 101 includes devices within a customer premises including one or more content processing devices 104a, 104b. A content processing device 104 may be a set top box (STB) or similar device known for receiving a media signal from a network and for providing media programming, e.g., audio, video, etc., to a media playback device 102. A content processing device 104 may be controlled by a user through any known control mechanism, e.g., a remote control (not shown), thereby facilitating the selection and playing of content through media playback device 102. A control mechanism may include numeric keys for selecting channels of video programming, as well as other keys for making selections and requests according to menus displayed on media playback device 102, in addition to arrow keys and the like for selecting channels and items in a menu, changing volume levels, etc. An example of content processing device 104 is set top box model number QIP6400 made by Motorola, Inc. of Schaumburg, IL.

A router 108 is used for establishing and operating, or at least connecting to, a network such as a home network or local area network (LAN), and is used to route communications within customer premises network 101. Significantly, router 108 provides for connection not only of one or more computing devices 110, but also allows for connection of content processing device 104. For example, content processing device 104 may be a set-top box connected to router 108 by a coaxial cable, while computing devices 110 may be connected to router 108 using a wireless connection, a network cable such as a "Cat5" cable, or the like. Further, content processing device 104 and computing devices 110 are each uniquely identified by router 108 in a known manner. For example, in one exemplary approach, Dynamic Host Configuration Protocol (DHUP) is used to dynamically assign "private" DHCP Internet Protocol (P) addresses to content processing device 104 and computing devices 110, i.e., IP addresses that are only accessible to devices such as devices 104 and 110 that are on customer premises network 101, i.e., in communication with router 108.

Media playback devices 102a, 102b may include a variety of known equipment alone or in combination, such as a video receiver, including a conventional television or a hi-definition television (HDTV), audio equipment including an amplifier and speakers, or devices that incorporate the capability to simultaneously process both video and audio data, etc. Media playback device 102 may be connected to, and receive multimedia content from, content processing device 104 in a known manner.

Content processing device 104 selectively communicates with gateway router 124 to send information to, and receive information from, media distribution network 114 and telecommunications network 118. A media distribution network 114 is a network for providing media transmissions, e.g., video signal 140 such as is known. For example, network 114 may include hardware and software for providing video signal 140 via coaxial cable and/or fiber optic cable, e.g., routers, switches, etc., as described further below. Video signal 140 is generally provided to a media distribution network 114 from a head end 116 in a known manner.

Various elements may be included as part of media distribution network 114 to provide media or other information to content processing device 104. For example, an interactive program guide (IPG) server 142 may selectively communicate with router 124 to provide an interactive program guide to content processing device 104, as is generally known. A video on demand (VOD) server 144, known for providing telecommunications customers with video content "on demand," may also be provided to selectively communicate with content processing device 104, generally via media distribution network 114. Additionally, activation server 146 may be provided to generally authorize and provision content processing device 104. For example, entitlement management data (EMM) may flow from activation server 146 when content processing device 104 is initially set up or placed in communication with system 100. EMM data may be provided by a service provider to authorize certain video content, e.g., packages of channels, to be decoded by content processing device 104, thereby generally preventing access from a public domain. PG server 142, VOD server 144, and activation server 146 may selectively communicate with content processing device 104 via Video Distribution Router (VDR) 148, which links servers 142, 144, 146 with media distribution network 114.

Media distribution network 114 and telecommunications network 118 are generally internet protocol (IP) networks. As such, networks 114, 118 generally use one or more known protocols for transporting data, such as user datagram protocol (UDP), transport control protocol (TCP), hypertext transfer protocol (HTTP), etc. Further, networks 114, 118 may include a variety of networks such as a wide area network (WAN), e.g., the Internet, a local area network (LAN), etc. As is known, networks 114, 118 may be used to transport a variety of data, including multimedia data such as audio data and video data. Accordingly, it is to be understood that other approaches are envisioned in which networks 114 and 118 are in fact combined into a single network, or in which media distribution network 114 is simply omitted, wherein telecommunications network 118 is used to provide video signal 140 to content processing device 104.

A gateway router 124 allows content processing device 104 to access networks 114, 118. By communicating with router 124, content processing device 104 is able to obtain a network address such as an internet protocol (IP) address, thereby enabling content processing device 104 to make requests to and to receive data from, an IPG server 142, and VOD server 144.

In the illustrated exemplary system, fiber optic cable may be used to provide both data and a video signal 140 to customer premises network 101, including to content processing device 104. As is known, an optical line terminal (OLT) 126 may serve as a terminus for an optical network or an optical line. OLT 126 may provide data, including video signal 140, to one or more optical network terminals (ONTs) 122. ONT 122 is generally situated adjacent to a customer premises, for the purpose of providing data received over an optical line to customer premises network 101, including content processing device 104. Accordingly, FIG. 1 illustrates a hybrid network system 100 in which video signal 140 transported over media distribution network 114, and also data transported over telecommunications network 118, are received by customer premises network 101 through a fiber optic line. However, it should be understood that other approaches are envisioned in which content processing device 104 receives both data and audio/video communications via media other than fiber optic cables to customer premises network 101.

Computing devices such as content processing device 104, computing devices 110, IPG server 142, VOD server 144, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Content processing device 104 generally is a specialized device for receiving video signals 140 from head end 116 via network 114, and may be provided with a proprietary or specialized operating system other than those enumerated above. For example, in one exemplary system, content processing device 104 is an STB provided with a real time operating system (RTOS) such as is known, However, it is to be understood that content processing device 104 may be a computing device such as one of those enumerated above, so long as the computing device is capable of receiving video signals 140 from network 114, and also is capable of storing and executing the instructions included in software agent 106.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

System 100 further includes one or more monitor probes 150, 152 and a monitoring agent 106 which communicate various operating parameters of system 100 to CMS 120, as further described below. Monitor probes 150, 152 may be in communication with various elements of system 100, e.g., gateway router 124 and video distribution router 148. Routers 124, 148 may have monitor probes 150, 152, respectively, interfaced through a Tap or Switch Port Analyzer (SPAN) port to monitor video streams transmitted by routers 124, 148. Agent 106 resides on content processing device 104 and includes computer-executable instructions that are generally stored in a computer-readable medium, e.g., a memory, of content processing device 104, and that may be executed by a processor included within content processing device 104. In general, monitoring agent 106 monitors hardware, network, and video parameters of content processing device 104 and is in communication with CMS 120 to facilitate diagnosis of problems or errors with various components of system 100, as will be described further below.

CMS 120 generally includes one or more auto-configuration servers which monitor operating parameters of system 100 relevant to hardware, network communications, and video quality of content processing device 104. Although only one server is shown for CMS 120, other envisioned approaches may include additional servers to carry out various functions of CMS 120. For example, CMS 120 may include a web server, application server, and database server. The servers may be actual and separate physical devices or virtual devices existing on one physical device. Alternatively, the servers may be application modules existing on one or more physical devices collectively comprising CMS 120. Additionally, CMS 120 may be provided with a firewall to allow for a secure connection with content processing device 104, Authorization protocols may be arranged with content processing device 104 to allow content processing device 104 access to CMS 120. CMS 120 generally monitors operating parameters of system 100 with monitor probes 150, 152, and monitoring agent 106, as further described below. Other monitoring probes and/or monitoring agents may be provided with system 100 to allow CMS 120 to monitor operating parameters of other elements of system 100, as may be convenient.

Software agent 106 and monitoring probes 150, 152 may conform with known operating standards for transmitting parameters relevant to performance of content processing device 104 or system 100 to CMS 120. For example, a variety of standards published by the Digital Subscriber Line (DSL) Forum may be employed, including protocols and data models specified in Working Text 135 (WT-135), the contents of which are incorporated herein in their entirety. WT-135 generally defines a data model for provisioning a content processing device with an Auto-Configuration server (ACS) such as CMS 120, using a mechanism defined in Technical Report 069 (TR-069), which is also incorporated herein in its entirety. Various parameters may be measured on IP streams and Radio Frequency (RF) transmissions to content processing device 104 to determine various operating parameters of system 100, as further described below. Other known parameters may be utilized in addition to or in place of parameters described herein. Monitoring parameters described herein generally relate to a hybrid implementation of a fiber-optic network by including health reports of content processing device 104 hardware, transport layer reports in the form of network parameters, and video specific reports, as will be described further below. Various parameters presented herein that are not specifically included in referenced specifications, e.g., the WT-135 specification, may be addressed as vendor specific extensions. For example, a Signal to Noise Ratio (SNR) of a video channel may generally indicate quality of the video signal. Additionally, entitlement management (EMM) data may be used where entitlement data is necessary to authorize a user of a content processing device to receive video content.

Monitoring agent 106 is generally supported by a software stack of content processing device 104. Agent 106 generally samples a video stream from media distribution network 114, a transport connection, and general hardware performance of content processing device 104, and provides the parameters to CMS 120. CMS 120 may be provided in a protected segment behind a firewall (not shown), wherein policies of the firewall and CMS 120 may provide necessary authorization and authentication for content processing device 104 to interact with CMS 120.

CMS 120 may monitor content processing device 104 in a variety of ways. In accordance with one exemplary approach, a recognized-standards-based approach using SNMP may be utilized. Communications using this alternative exemplary approach between content processing device 104 and CMS 120 may be asymmetric, in that requests are over the Out of Band (OOB) channel and responses are In Band over an EP path. In accordance with one example, a DSL-Forum-standards-based approach using TR-069 protocols and data structures to manage, provision, and monitor devices in a private segment behind a Network Address Translation (NAT) device, e.g., router 108. Communication between content processing device 104 and CMS 120 may occur via an application-layer protocol and be secured by a standards-based application security layer, similar to Transport Layer Security (TLS). Communication between content processing device 104 and CMS 120 may generally be In-Band over IP.

Figure 2:
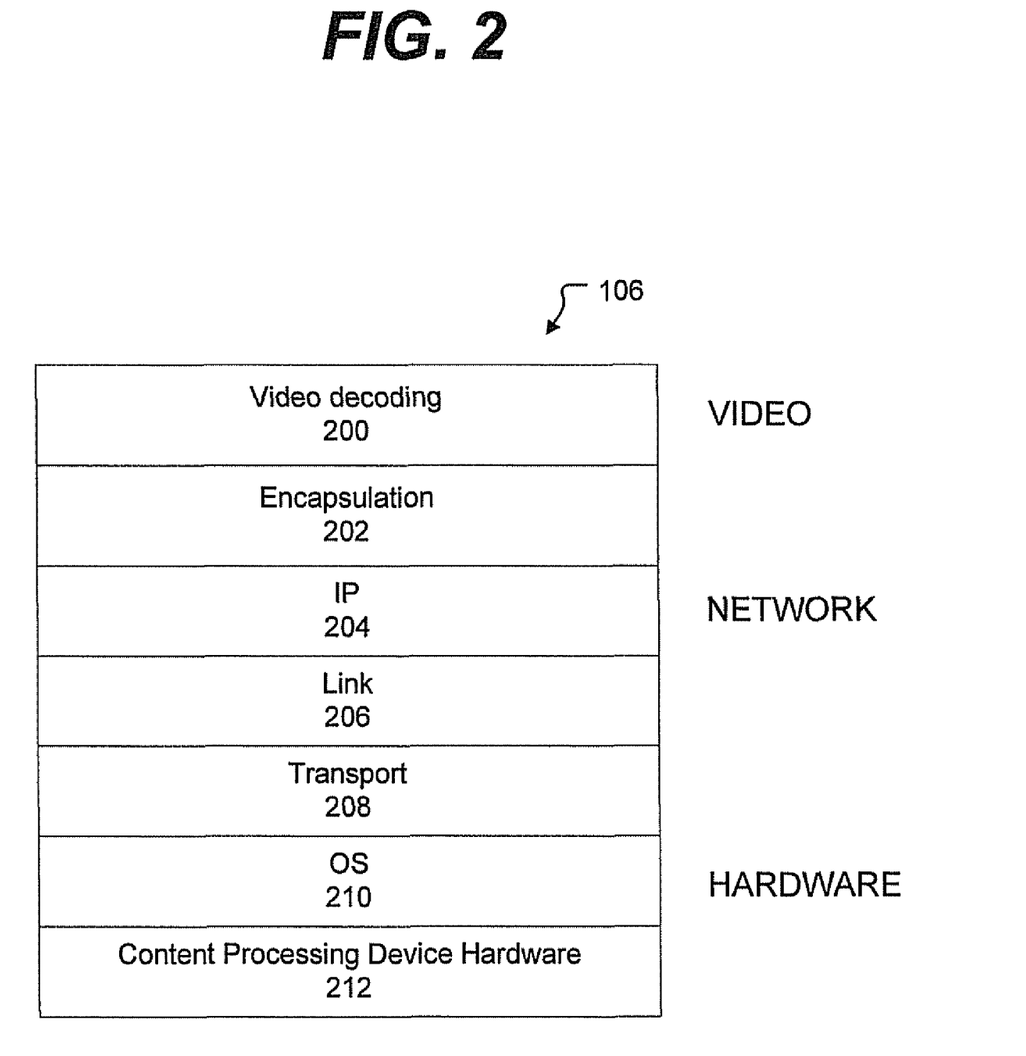
FIG. 2 illustrates an exemplary schematic representation of a monitoring agent for a content processing device.

Monitoring agent 106 generally includes various layers relevant to operating parameters of hardware, network, and video layers of content processing device 104. Turning now to FIG. 2, a schematic diagram of a plurality of monitoring layers of agent 106 is illustrated, according to one acceptable example. Agent 106 may include an video decoding layer 200, an encapsulation layer 202, an IP communication layer (L3) 204, a link (L2) layer 206, a transport layer (L1) 208, an operating system layer 210, a content processing device hardware layer 212, and content processing device middleware (not shown). The operating system layer reports hardware parameters of content processing device 104 to CMS 120. Additionally, IP layer 204 reports network parameters, and video decoding layer 200 reports video quality parameters, to CMS 120. This layered approach allows a customer service representative (CSR) accessing CMS 120 to troubleshoot and isolate problems with content processing device 104 or system 100 by determining which layer is at fault, and tracing the issue to the source. For example, audio/video synchronization problems may be introduced into system 100 from head end 116 at an encoder or re-multiplexer (not shown) associated with head end 116, as indicated by an associated hardware or software probe (not shown) of an encoder or re-multiplexer. Such a problem may be identified using video layer measurements by examining Program Clock Reference (PCR) values, as further described below. Agent 106 may generally report relevant hardware, network, and video parameters to CMS 120.

Agent 106 may monitor a hardware layer of content processing device 104 with onboard hardware diagnostics. The diagnostics may be used to report operating states of various core hardware subsystem components of content processing device 104 and report to CMS 120 via IN-Band communications. For example, a content processing device 104 according to one exemplary approach, a Motorola STB, may provide an Application Programming Interface (API) to access specific service metrics of content processing device 104, e.g., error counts, SNR values, carrier lock indications, program clock references (PCR), etc. In-band (B) transport stream health information can be employed to determine integrity of a video path, e.g., a path within media distribution network 114, during a given session. Out-of-band (OOB) transport stream health information can be used to determine reliability of session command and control. Parameters which may be employed for hardware monitoring include:

- Error Code: The error code parameter allows CMS 120 to retrieve an internal error code of content processing device 104, e.g., boot failure, battery test failure, ram test failure, etc.
- Connected State: This parameter allows CMS 120 to determine a connected or disconnected status of content processing device 104.
- Model ID: This allows CMS 120 to retrieve a model identifier of content processing device 104.
- Unit Address: This parameter allows CMS 120 to determine an IP address of content processing device 104. A unit address parameter may be a decimal representation of an IP address, e.g., "xxx-xxxxx-xxxxx-xxx."
- MAC Address: This parameter enables CMS 120 to determine a Media Access Control (MAC) address of content processing device 104.
- Out of Band (OOB) Carrier Lock: This parameter allows CMS 120 to determine a carrier lock status of an OOB frequency of content processing device 104.
- OOB Lost Carrier Lock Count: This parameter allows CMS 120 to determine a cumulative number of times the OOB tuner has lost lock on an OOB frequency of content processing device 104.
- OOB Data Present: This allows CMS 120 to determine if data is present in an OOB stream of content processing device 104.
- Signal to Noise Ratio (SNR) for OOB and IB: This parameter allows CMS 120 to determine a SNR for OOB channel and an IB channel of content processing device 104.
- Signal to Noise State for OOB and IB: This parameter may indicate a subjective state of the SNR for OOB and IB communications of content processing device 104 based on predetermined levels, e.g., poor, fair, or good.
- Automatic Gain Control (AGC) State OOB and IB: This parameter may indicate a subjective state of an AGC of content processing device 104: for example, poor, fair, or good.
- IB Program Clock Reference (PCR): This parameter generally CMS 120 to determine an IB Tuner PCR lock status of content processing device 104.
- IB Modulation Mode: This parameter indicates an IB Tuner modulation mode of content processing device 104; e.g., Analog, QAM64, or QAM256, to CMS 120.
- IB Carrier Lock Status: This parameter allows CMS 120 to determine a carrier lock status of an IB frequency of content processing device 104.
- IB Data Lock Status: This parameter allows CMS 120 to determine an IB tuner data lock status of content processing device 104. For example, a positive IB data lock status parameter indicates that the IB tuner is locked to data.
- IB Tuner Frequency: This parameter indicates a current IB frequency of content processing device 104, in Hertz, to CMS 120.
- IB Corrected Errors: This parameter indicates a number of corrected errors of content processing device 104 to CMS 120. For example, this parameter may indicate a count of Forward Error Correction (FEC) corrected errors in an IB transport stream of content processing device 104.
- IB Uncorrected Errors: This parameter may indicate a cumulative number of uncorrected errors of an IB frequency of content processing device 104. For example, this parameter may indicate a count of FEC uncorrected errors in an IB transport stream of content processing device 104.
- IB Long Term Errors: This parameter may indicate a number of IB frequency errors of content processing device 104 over an extended period, e.g., 24 hours.
- Current Tuned IB Channel: This parameter allows CMS 120 to determine various parameters associated with a current tuned channel, e.g., tuned freq, copy protection, retention state value, authorization, scrambled, encrypted, unencrypted, clear, etc.
- STB Bootloader Version: This parameter indicates a bootloader version of content processing device 104 to CMS 120.
- STB Firmware Version: This parameter indicates a firmware version of content processing device 104 to CMS 120.
- Memory Configuration: This parameter indicates system. RAM, Flash and NVRAM values of content processing device 104, e.g., in KB, to CMS 120.
- STB Interface Status: This parameter allows CMS 120 to determine availability of various interfaces of content processing device 104, e.g., Mobile Collaboration Architecture (MoCA) status, JEEE1394 status, Universal Serial Bus (USB) status, Ethernet status, Digital Video Interface (DVI) status, Smart Card status, Hard Disk status, etc.

Various other hardware performance parameters that are known may be employed to determine operating status of a hardware layer of content processing device 104.

Monitoring of a network or IP layer of content processing device 104 may be performed from head end 116 to content processing device 104, i.e., "end-to-end," for a media stream transmitted from head end 116 to content processing device 104. Passive methods of monitoring network layer Of content processing device 104 may include monitoring variables such as packet loss, packet rate, dropped packets and status of video traffic queues. Active monitoring may report throughput, latency, packet loss and jitter of synthetic video traffic streams injected into system 100. Various standards may be employed for determining video packet calculations, such as International Telecommunications Union Specification No. Rec.Y 1541 (ITU-T Rec. Y 1541), which is incorporated herein in its entirety. For example, video specific network performance parameters which may be employed according to ITU-T Rec.Y 1541 to determine network performance may include:

Transfer Delay/Latency (IPTD): This parameter defines a time period required for a packet to traverse the network, excluding packets out of order, A large IPTD affects quality of a video session, impairs performance of interactive applications of content processing device 104 and negatively affects failure recovery. An IPTD for one-way communication is preferably less than 100 ms.

Delay Variation (IPDV): This parameter defines a second order difference in inter-arrival time of packets, or "jitter." Packets out of order may be excluded from the calculation. Excessive jitter can be compensated to some degree by a providing a buffer at the cost of extra memory of content processing device 104. Jitter increases the risk of packet loss (buffer overruns) or underruns. An IPDV for one-way communication is preferably less than 50 ms.

Packet Loss Ratio (IPLR): This parameter defines a ratio of lost packets to total packets per unit of Time. This parameter preferably represents a long term average. Excessive IPLR may degrade quality of a video stream. An IPLR for one-way communication to content processing device is preferably less than $1\times10^{-3}$.

Packet Loss Distance (LD): This parameter indicates a count of IP packets transmitted between lost IP packets, including any packets delivered out of range of a Transfer Delay (IPTD) associated with content processing device 104. Losses may be separated by a minimum loss distance in order for FEC to operate correctly. If a minimum loss distance is not met, then FEC may not adequately prevent video errors. LD is preferably greater than 100 (packets).

Packet Loss Period (LP): This parameter indicates a count of consecutive lost IP packets and any packets delivered out of range of Transfer Delay/Latency or Delay Variation. FEC may not operate correctly, resulting in video errors, if LP exceeds a specified maximum period. LP is preferably less than 5 (packets).

Packet Error Ratio (IPER): This parameter represents a ratio of packet errors to total packets per unit of time. IPER may be determined over a period of time, i.e., IPER may be a long-term average. Excessive IPER generally invokes an FEC algorithm, thereby consuming processing power of content processing device 104. Uncorrected errors may accordingly cause video errors. IPER for one-way communication to content processing device 104 is preferably less than $1\times10^{-4}$.

Spurious Packet Rate (SPR): This parameter indicates a number of packets received by content processing device 104 without a corresponding transmitted packet. Spurious packets may be caused by packet corruption, packet duplication, misrouting in system 100, intrusion or denial of service attacks. SPR is preferably less than $1\times10^{-3}$ spurious packets per second.

Various other network performance parameters that are known may be employed to determine an operating status of a network layer of content processing device 104.

Agent 106 may monitor a video layer of content processing device 104 in a variety of ways, including active and passive methods. Active methods generally insert test packets into a media distribution system, and downstream probes analyze the packets. Alternatively, passive measurement methods do not inject any new or extra packets into a video stream, and instead extract quality and performance parameters from a production packet stream, Accordingly, passive methods are generally limited to specific indexes or metrics that can be obtained from the sampled stream data only.

Video quality parameters may further include objective and subjective measures of video quality. Objective measurements generally derive video/picture quality from physical measurements of the picture. Subjective measurements may establish picture quality scores based on a consensus of a viewing audience. As a result, subjective measures may be used to produce a so called Mean Opinion Score (MOS). Objective quality indices may be used for gauging picture quality since they may be correlated with physical picture impairments, while subjective impairments may be more difficult to define and correlate to measurable parameters of the video service. Video layer monitoring may include video stream quality (VSQ) measurements such as Media Delivery Index, further described below. Video layer monitoring may also include video picture quality (VPQ) measurements such as V-Factor, further described below.

In accordance with one envisioned approach, video layer monitoring includes parameters selected from the WT-135 specification described above, the European Telecommunications Specification Institute TR110.290 specification, the ITU-T J.241 specification and Video Quality Expert Group (VQEG) parameters. According to one example of system 100 these parameters include:

V-Factor: This parameter is generally based upon Moving Picture Quality Metrics (MPQMs), and is an objective assessment of video quality perceived by a user. V-Factor is generally computed from the following formula:

$$V=f(Q_{ER},PLR,\Gamma^R)$$

where:
$Q_{ER}$=Relative Codec Video Quality Assessment (from 0 [low] to 5 [high]);
PLR=Packet Loss Rate (from Network impairments and jitter buffer model); and
$\Gamma^R$ Image complexity factor (from 2[low] to 3[high])
V-Factor therefore takes into account transmission quality, encoder and decoder impairments, and image complexity via the PLR, $Q_{ER}$, and $\Gamma^R$ factors, respectively.

Video Quality of Service (VQS) index of estimated MOS (VQmon/SA-VM): This parameter, developed by Telchemy, Inc., is an objective measurement that generally measures time distribution of lost or discarded media packets using a multi-state statistical model, examines type of video codec, bit rate and other factors, and uses a perceptual model to calculate a video transmission quality factor and estimated VQS (MOS) opinion score. VQmon/SA-VM is a "zero reference" method, i.e., it estimates quality of an IP video stream based on a type of video codec, loss rate, loss distribution and other parameters. VQmon/SA-VM generally produces two video quality metrics: (1) a Video Service Transmission Quality (VSTQ) score and (2) a VQS score. VSTQ is intended to provide a rating of the ability of the IP packet transport to support video and VQS estimates perceived user quality. A VSTQ rating is scaled from zero to 50 and considers packet loss rate, distribution of lost packets (i.e. burstiness), a type and bit rate of codec. VQS rating is scaled from one to five and incorporates subjective factors such as content dependency factors.

Media Delivery Index (MDI): MDI may be used to monitor performance and quality on a media transmitted from VOD server 144. MDI is a measure of IP cumulative jitter and media loss. Alarms and thresholds may be determined on a per stream basis, since Video over IP (VoIP) streams may come from different sources may include different video types, e.g., standard definition (SD) video or high definition (HD) video. MDI can be used to passively or actively monitor live voice and video over IP flows. MDI may thus provide an indication of IP cumulative jitter and media loss. MDI is expressed as Delay Factor (DF) & Media toss Rate (MLR) components, as further described below. Alarm conditions and thresholds may be set on an ingress and egress point of system 100 and for various routers within a network, e.g., for example at content processing device 104, router 108, ONT 122, OLT 126, etc. The MDI has two components: the Delay Factor (DF) and the Media Loss Rate (MLR), which may be displayed as: DF:MLR. DF is computed at the arrival time of each packet at the point of measurement and displayed and/or recorded at predetermined time intervals, e.g., about 1 second. DF is updated and displayed at the end of an interval. Given a virtual buffer level X where DF is being measured, $$X = |\text{Bytes Received} - \text{Bytes Drained}|$$

Then, $$DF = [\max(X) - \min(X)]/\text{media rate}$$

Where media rate is expressed in Bytes/second and max (X) and min(X) are maximum and minimum values measured in an interval DF represents the time it takes to empty a virtual buffer at a video rate, DP indicates a latency contribution from the network to the total latency in delivering the video from source to destination. Excessive network jitter requiring large buffers to smooth may result in unacceptable end-to-end delay. MLR is computed by subtracting the number of media packets received during an interval from the number of media packets expected during that interval and scaling the value to 1 second:

$$MLR(\text{Packets Expected} - \text{Packets Received})/\text{interval time in seconds}$$

MLR is the number of media packets lost per second. Accordingly, MDI generally provides a network margin indication that warns CSRs of impending operational issues with enough advance notice to allow corrective action before observed video is impaired.

Packet loss ratio: This parameter is similar to the packet loss ratio parameter described above in regard to network parameters, but may be employed as a video parameter as a component of an index like V-Factor that examines video packets instead of network packets. As described above, packet loss ratio generally monitors a percentage of packets lost within the network.

Burst Density: This parameter measures a percentage of packets lost and discarded within a high loss rate or "burst" period.

Burst Length: This parameter may indicate a mean length of a burst period in milliseconds (mS).

Gap Density: This parameter may indicate a fraction or percentage of packets lost or discarded within a low loss rate or "gap" period.

Gap Length: This parameter may indicate a mean length of a gap period in milliseconds (mS).

Buffer levels: This parameter may indicate a minimum, maximum, or average percentage of data flows in or out of a jitter buffer.

Additionally, a master synchronizing signal, a Programmable Clock Reference (PCR), may be embedded at an encoder of head end 116 (not shown). PCRs are generally snapshots of a counter, driven by a program clock (27 MHz), which may be inserted into packets at any point within a transport stream at predetermined intervals, e.g., every 100 ms, every 40 ms, etc. These timing packets may be re-processed, delayed, jittered or even dropped during transmission to content processing device 104. PCR values generally are created upon encoding of each video signal and typically recalculated at a transmission link, e.g., router 124, to compensate for effects of re-multiplexing and network delays. Therefore any errors may be caused either at an origination point of a signal (e.g., a broadcast studio) or anywhere downstream during signal transport. To locate the exact point of error insertion, transport stream monitoring is preferably applied at various test points within the packet network. As an example, FIG. 1 shows test points as hardware probes 150, 152. Other test points may be employed where convenient. The following PCR parameters may be monitored by agent 106:

PCR overall jitter: This parameter is an overall measurement of high frequency errors in PCR values and includes errors from both PCR generation and regeneration, as well as arrival time errors caused by transmission impairments.

PCR drift rate: This parameter indicates low-frequency errors in PCR values and includes errors from both PCR generation and regeneration, as well as arrival time errors caused by transmission impairments.

PCR accuracy: The parameter represents inaccuracies in the 27 MHz clock contained within the received PCR values, but does not include measurements of transmission timing impairments.

PCR frequency offset: This parameter represents a frequency offset of the 27 MHz clock contained within the PCR values, measured against a stable external reference.

Transport Stream (TS) sync loss: This parameter represents loss of synchronization with consideration of hysteresis parameters.

Sync byte error: This parameter indicates that a Sync byte measurement is not equal to 0x47.

Program Association Table (PAT) error 2: This parameter indicates when a section with a table ID other than 0x00 is found on a Packet Identifier (PD) 0x0000. A Section with table id 0x00 generally does not occur for a period of at least every 0.5 s on PD 0x0000.

Continuity count error: This parameter indicates a number of occurrences of an incorrect packet order, a packet occurring more than twice, or a lost packet.

Program Map Table (PMT) error 2: This parameter generally indicates that a PMT extra was not sent on schedule. A section with a table D 0x02, i.e., a PMT, generally occurs no less than every 0.5 seconds for each program map ID which is referred to in a PAT. A scrambling control field is generally not equal to zero for any packet containing information for sections having a table ID 0x02.

PID_error (program ID): This parameter indicates when a particular PID does not occur for a predetermined period of time.

Transport error: This parameter indicates when a transport error indicator in the Transport Stream (TS) Header is set to "1," thereby indicating an occurrence of a transport error.

Cyclic Redundancy Check (CRC) error: This parameter indicates that a CRC error occurred in a Conditional Access Table (CAT), Program Association Table (PAT), Program Map Table (PMT), Network Information Table (NIT), Event Information Table (EIT), Bouquet Association Table (BAT), Service Description Table (SDT), or Time Offset Table (TOT).

PCR repetition error: This parameter indicates that a time interval between two consecutive PCR values is greater than 40 ms.

PCR discountinuity indicator error: This parameter indicates that a difference between two consecutive PCR values is outside the range of 0-100 ms without setting a discontinuity indicator signal.

Presentation Time Stamp (PTS) error: This parameter indicates a PTS repetition period of greater than 700 ms.

CAT error: This parameter indicates that a packet with a transport scrambling control value other than zero is present, and that no section with a table ID equal to 0x01 is present.

Figure 3:
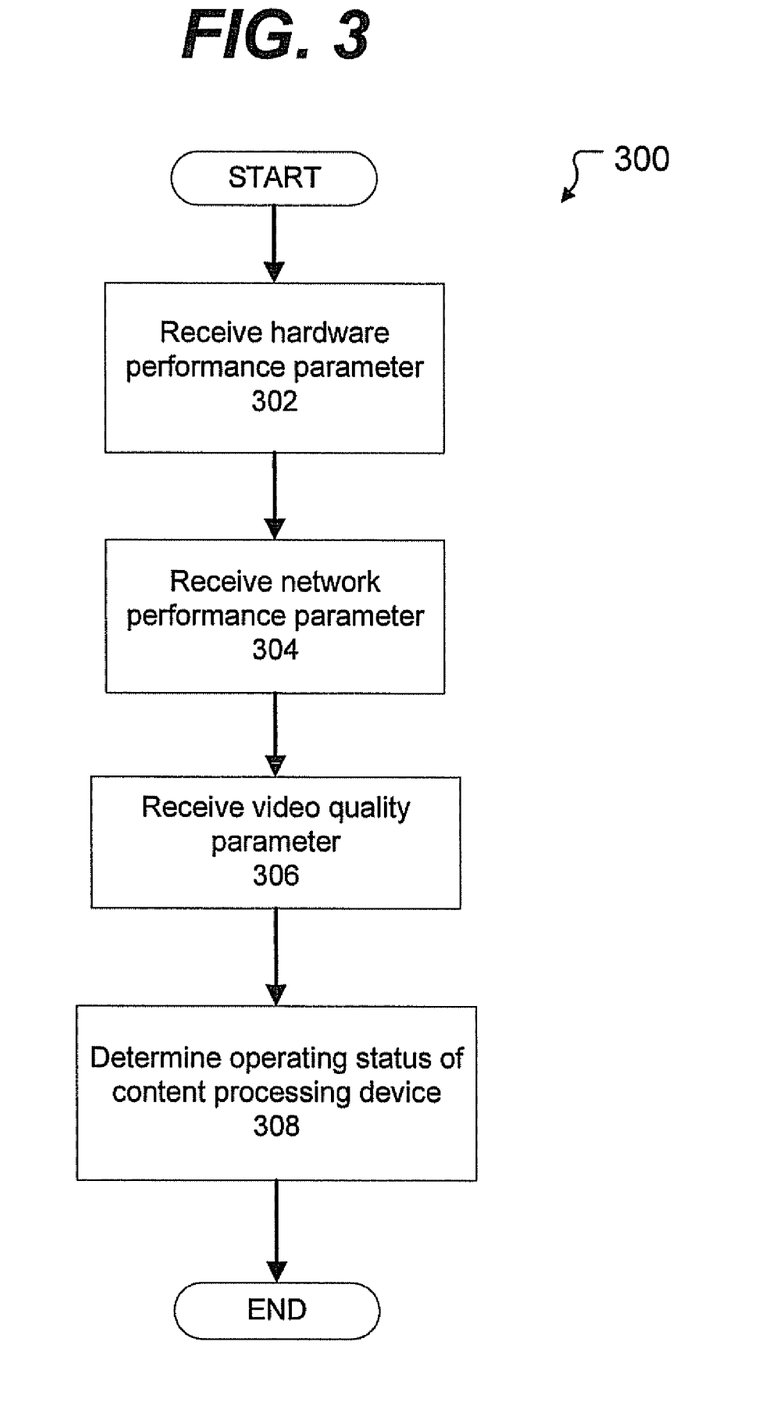
FIG. 3 illustrates an exemplary process for monitoring a content processing device.

Turning now to FIG. 3, an exemplary process 300 for monitoring performance of system 100 is illustrated.

Process 300 may begin at step 302, where CMS 120 receives at least one hardware performance parameter from content processing device 104. Any variety of hardware performance parameters may be received by CMS 120, as described above. Process 302 may then proceed to step 304.

In step 304, CMS 120 receives at least one network performance parameter from content processing device 104. Any of the network performance parameters described above, as well as other known network performance parameters not specifically described above, may be determined by content processing device 104 and transmitted to CMS 120. Process 300 may then proceed to step 306.

In step 306, CMS 120 receives at least one video quality parameter from content processing device 104. For example, any of the video quality parameters described above, or other known video quality parameters, may be transmitted to CMS 120. Process 300 may then proceed to step 308, In step 308, CMS 120 may determine an operating status of content processing device 104 and/or other elements of system 100 from the hardware performance, network performance, and video quality parameters received in steps 302, 304, and 306, respectively. As described above, a CSR may use information supplied by CMS 120 to remotely troubleshoot content processing device 104 or other elements of system 100, or even identify network issues before a customer perceives a problem with the network. Further, CMS 120 may indicate service problems to content processing device 104, thereby allowing customers to self-diagnose service problems, minimizing service calls for known network issues.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain approaches, examples or embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a content processing device;
a monitoring agent included within the content processing device, the monitoring agent configured to monitor and report, via an in-band communication, at least one video quality parameter of a video stream at the content processing device during transmission of the video stream;
one or more monitoring probes configured to monitor and report at least one video quality parameter of the video stream at one or more locations upstream of the content processing device; and
a customer premises management system configured to selectively communicate with the content processing device, the monitoring agent, and the one or more monitoring probes, and configured to determine an operating status of the content processing device based on the at least one video quality parameter of the video stream at the content processing device received from the monitoring agent and the at least one video quality parameter of the video stream at the one or more locations upstream of the content processing device received from the one or more monitoring probes, wherein the at least one video quality parameter of the video stream at the content processing device and the at least one video quality parameter of the video stream at the one or more locations upstream of the content processing device comprise a V-factor according to the equation $$V = f(Q_{ER}, PLR, \Gamma^R) \text{ where:}$$

$Q_{ER}$ is a relative codec video quality assessment,
PLR is a packet loss rate, and
$\Gamma^R$ is an image complexity factor.

2. The system of claim 1, wherein the customer premises management system includes at least one auto-configuration server.

3. The system of claim 1, wherein the customer premises management system includes a web server, an application server, and a database server.

4. The system of claim 1, wherein the customer premises management system includes a firewall.

5. The system of claim 1, further comprising a telecommunications network in communication with the customer premises management system, the customer premises management system configured to selectively communicate with the content processing device over the telecommunications network.

6. The system of claim 5, wherein the telecommunications network is a packet switched network.

7. The system of claim 1, further comprising a media distribution network in communication with the content processing device, the media distribution network configured to selectively transmit the video stream to the content processing device.

8. The system of claim 7, wherein the media distribution network is a packet switched network.

9. The system of claim 7, wherein the media distribution network includes a video-on-demand server configured to selectively transmit the video stream to the content processing device.

10. The system of claim 7, further comprising a gateway router that is connected between the content processing device, the media distribution network, and the customer premises management system, the gateway router being configured to transport data between the content processing device, the media distribution network, and the customer premises management system.

11. The system of claim 10, wherein:
the one or more monitoring probes comprises a first monitoring probe interfaced with the gateway router by way of a tap or switch port analyzer port, and
the at least one video quality parameter of the video stream at the one or more locations upstream of the content processing device comprises at least one video quality parameter of the video stream at the gateway router.

12. The system of claim 11, wherein:
the one or more monitoring probes comprises a second monitoring probe within the media distribution network interfaced with a video distribution router by way of a tap or switch port analyzer port; and
the at least one video quality parameter of the video stream at the one or more locations upstream of the content processing device further comprises at least one video quality parameter of the video stream at the video distribution router.

13. The system of claim 1, wherein the content processing device is configured to transmit and receive data over a fiber optic line.

14. The system of claim 1, wherein the monitoring agent is further configured to utilize an application programming interface provided by the content processing device to access specific service metrics of the content processing device.

15. The system of claim 1, wherein the monitoring agent is further configured to monitor and report at least one parameter associated with a programmable clock reference.

16. The system of claim 15, wherein the at least one parameter associated with the programmable clock reference comprises at least one of programmable clock reference overall jitter, programmable clock reference drift rate, programmable clock reference accuracy, and programmable clock reference frequency offset.

17. The system of claim 1, wherein the customer premises management system is further configured to:
remotely detect one or more video quality issues associated with the video stream based on the at least one video quality parameter of the video stream at the content processing device received from the monitoring agent and the at least one video quality parameter of the video stream at the one or more locations upstream of the content processing device received from the one or more monitoring probes; and
remotely identify the source of the one or more video quality issues associated with the video stream based on the at least one video quality parameter of the video stream at the content processing device received from the monitoring agent and the at least one video quality parameter of the video stream at the one or more locations upstream of the content processing device received from the one or more monitoring probes.

18. The system of claim 17, wherein the customer premises management system is further configured to remotely deploy one or more troubleshooting tools configured to resolve the one or more video quality issues associated with the video stream.

19. A method, comprising:
selectively communicating, by a customer premises management system, with a content processing device;
monitoring, by a monitoring agent included within the content processing device, at least one video quality parameter of a video stream at the content processing device during transmission of the video stream;
receiving, by the customer premises management system, data representative of the at least one video quality parameter of the video stream at the content processing device from the monitoring agent via an in-band communication;
monitoring, by one or more monitoring probes, at least one video quality parameter of the video stream at one or more locations upstream of the content processing device;
receiving, by the customer premises management system, data representative of at least one video quality parameter of the video stream at the one or more locations upstream of the content processing device from the one or more monitoring probes; and
determining, by the customer premises management system, an operating state of the content processing device from at least one of the at least one video quality parameter of the video stream at the content processing device received from the monitoring agent and the at least one video quality parameter of the video stream at the one or more locations upstream of the content processing device received from the one or more monitoring probes, wherein the at least one video quality parameter of the video stream at the content processing device and the at least one video quality parameter of the video stream at the one or more locations upstream of the content processing device comprise a V-factor according to the equation $$V = f(Q_{ER}, PLR, \Gamma^R)$$ where:

$Q_{ER}$ is a relative codec video quality assessment,
PLR is a packet loss rate, and
$\Gamma^R$ is an image complexity factor.

20. The method of claim 19, further comprising:
transmitting, by a head end, the video stream to the content processing device over a packet-switched network.

21. The method of claim 20, wherein:
the monitoring by the one or more monitoring probes comprises monitoring, by a first monitoring probe interfaced, by way of a tap or switch port analyzer port, with a gateway router configured to transport data between the customer premises management system, the content processing device, and the head end, at least one video quality parameter of the video stream at the gateway router, and
the receiving the data representative of the at least one video quality parameter of the video stream at the one or more locations upstream of the content processing device comprises receiving at least one video quality parameter of the video stream at the gateway router from the first monitoring probe.

22. The method of claim 21, wherein:

the monitoring by the one or more monitoring probes further comprises monitoring, by a second monitoring probe interfaced, by way of a tap or switch port analyzer port, with a video distribution router within a media distribution network associated with the head end, at least one video quality parameter of the video stream at the media distribution network, and the receiving the data representative of the at least one video quality parameter of the video stream at the one or more locations upstream of the content processing device further comprises receiving the at least one video quality parameter of the video stream at the media distribution network from the second monitoring probe.

23. A customer premises management system, comprising:

at least one auto-configuration server in communication with a content processing device and one or more monitoring probes at one or more locations upstream of the content processing device, the content processing device supporting a monitoring agent configured to selectively communicate with the at least one auto-configuration server and to monitor and report, via an in-band communication, at least one video quality parameter of a video stream at the content processing device, the one or more monitoring probes configured to selectively communicate with the at least one auto-configuration server and to monitor and report at least one video quality parameter of the video stream at the one or more locations upstream of the content processing device;

wherein the at least one auto-configuration server is configured to determine an operating status of the content processing device from the at least one video quality parameter of the video stream at the content processing device received from the monitoring agent and the at least one video quality parameter of the video stream at the one or more locations upstream of the content processing device received from the one or more monitoring probes, wherein the at least one video quality parameter of the video stream at the content processing device and the at least one video quality parameter of the video stream at the one or more locations upstream of the content processing device comprise a V-factor according to the equation $V = f(Q_{ER}, PLR, \Gamma^R)$ where:

$Q_{ER}$ is a relative codec video quality assessment,
PLR is a packet loss rate, and
$\Gamma^R$ is an image complexity factor.

24. The customer premises management system of claim 23, wherein the at least one auto-configuration server includes a web server, an application server, and a database server.

25. The customer premises management system of claim 23, wherein the content processing device receives the video stream from a media distribution network.

26. The customer premises management system of claim 25, wherein the media distribution network is a packet switched network.

27. The customer premises management system of claim 25, wherein:

the one or more monitoring probes comprises a first monitoring probe interfaced, by way of a tap or switch port analyzer port, with a gateway router configured to transport data between the customer premises management system, the content processing device, and the media distribution network, the at least one video quality parameter of the video stream at the one or more locations upstream of the content processing device comprises at least one video quality parameter of the video stream at the gateway router, the one or more monitoring probes further comprises a second monitoring probe interfaced, by way of a tap or switch port analyzer port, with a video distribution router within the media distribution network, and the at least one video quality parameter of the video stream at the one or more locations upstream of the content processing device further comprises at least one video quality parameter of the video stream at the media distribution network.

28. The customer premises management system of claim 23, wherein the content processing device is configured to transmit and receive data over a fiber optic line.

* * * * *